US007578023B2

(12) United States Patent
Olson

(10) Patent No.: US 7,578,023 B2
(45) Date of Patent: Aug. 25, 2009

(54) APPLICATOR PAD

(75) Inventor: Gary L. Olson, Shoreview, MN (US)

(73) Assignee: 3M Innovative Properties Company, St. Paul, MN (US)

(*) Notice: Subject to any disclaimer, the term of this patent is extended or adjusted under 35 U.S.C. 154(b) by 794 days.

(21) Appl. No.: 10/944,987

(22) Filed: Sep. 20, 2004

(65) Prior Publication Data

US 2005/0241095 A1 Nov. 3, 2005

Related U.S. Application Data

(63) Continuation-in-part of application No. 10/835,946, filed on Apr. 30, 2004, now abandoned.

(51) Int. Cl.

| | |
|---|---|
| ***A47L 13/16*** | (2006.01) |
| ***A47L 13/20*** | (2006.01) |
| ***A47L 13/29*** | (2006.01) |
| ***B32B 5/00*** | (2006.01) |

(52) U.S. Cl. ............................ 15/228; 15/208; 428/85; 428/89; 428/172; 428/212; 428/220; 428/903; 442/344

(58) Field of Classification Search .................. 15/208, 15/209.1, 210.1, 210.5, 228; 428/85, 89, 428/903, 156, 172, 212, 220; 442/344, 346
See application file for complete search history.

(56) References Cited

U.S. PATENT DOCUMENTS

| | | | |
|---|---|---|---|
| 2,875,461 | A | 3/1959 | Anderson |
| 2,958,593 | A | 11/1960 | Hoover et al. |
| 3,180,782 | A | 4/1965 | Coates et al. |
| 3,638,270 | A | 2/1972 | Schelegel et al. |
| 4,100,324 | A | 7/1978 | Anderson et al. |
| 4,244,074 | A | 1/1981 | Barcikowski et al. |
| 4,426,417 | A | 1/1984 | Meitner et al. |
| 4,893,439 | A | 1/1990 | McAvoy et al. |
| 4,961,242 | A | 10/1990 | Kresse et al. |
| 4,961,243 | A | 10/1990 | Barber |
| 5,591,507 | A | 1/1997 | Jones |
| 5,643,653 | A | 7/1997 | Griesbach |
| 5,804,274 | A | 9/1998 | Nordin |
| 5,962,112 | A | 10/1999 | Haynes et al. |
| 7,033,965 | B2 | 4/2006 | Takabayashi et al. |
| 2003/0009839 | A1 | 1/2003 | Streutker et al. |
| 2003/0021944 | A1 | 1/2003 | Morin et al. |
| 2003/0045197 | A1 | 3/2003 | Kakiuchi et al. |
| 2007/0141299 | A1 | 6/2007 | Hong |

FOREIGN PATENT DOCUMENTS

| | | | |
|---|---|---|---|
| DE | 19956652 | A1 | 4/2001 |

(Continued)

*Primary Examiner*—Mark Spisich
(74) *Attorney, Agent, or Firm*—Jeffrey M. Olofson

(57) ABSTRACT

The present invention features a fabric useful for applying a chemical composition, such as a finishing or polishing composition, onto a substrate surface. Typically the fabric contains between about 1% and 50% stiff fibers and between about 50% and 99% adsorbent or absorbent fibers, more typically between about 2% and 10% stiff fibers and between about 90% and 98% adsorbent or absorbent fibers. The fabric can be used to make applicator pads useful, for example, as mop heads for spreading a finishing or polishing composition on a floor surface.

24 Claims, 2 Drawing Sheets

FOREIGN PATENT DOCUMENTS

| | | |
|---|---|---|
| EP | 0222955 | 5/1987 |
| EP | 0291100 | 11/1988 |
| EP | 1212972 | 6/2002 |
| EP | 1342825 | 9/2003 |
| GB | 2031039 | 4/1980 |
| JP | 08228983 | 9/1996 |
| JP | 2003/304993 | 10/2003 |

APPLICATOR PAD

CROSS REFERENCE TO RELATED APPLICATIONS

This application is a continuation-in-part application of application Ser. No. 10/835,946, filed on Apr. 30, 2004 now abandoned, which is hereby incorporated by reference herein in its entirety.

FIELD OF THE INVENTION

The present invention relates to an applicator pad useful for applying a chemical composition, such as a finishing or polishing composition, onto a substrate surface. More specifically, the present invention relates to a floor mop pad that includes a combination of fibers making it well suited for spreading, for example, a finishing or polishing composition on a floor surface. In addition, the invention relates to a method for applying a floor finish or similar composition onto a substrate.

BACKGROUND

There are a myriad of situations in which a coating composition is applied onto a surface in order to impart the surface with desired properties. For example, floor polishing or finishing compositions are widely used in commercial buildings, educational institutions, homes, and restaurants to provide durability, toughness and gloss to the floor surface and enhance its wear resistance. Some floor finish preparations are applied by spraying; others are applied using a mop or similar applicator or some combination thereof. The application of floor finishes is commonly performed manually by pouring a liquid floor finish composition from a container and spreading the floor finish across the floor surface with a mop or squeegee device. For larger surfaces, such as those found in commercial settings, two or more individuals often work together to apply a floor finish. One method is to have one worker spreading or spraying the finishing composition on the floor while another worker follows behind dragging a mop or other type of spreader through the wet composition in order to evenly and smoothly distribute it on the floor surface. The spreading process is labor intensive and typically requires maintenance personnel to make multiple passes of the mop over the floor surface in order to achieve a complete and even coverage of the floor area. For a large commercial building, such an operation could take many man-hours to apply a single coat of finish to the floor.

A variety of different mops or applicators have been used to spread floor finish on a floor surface. Applicators with a flat mop head made of microfibers are often used, because they tend to provide a smooth, even coverage of floor finish, without leaving undesirable streaks or mop marks in the floor finish. However, such mop heads typically exhibit a high degree of drag when run across a floor surface. Conventional mop constructions employing microfibers tend to mat down, thereby creating an increase in drag force when wet with, for example, water, floor finish, or cleaning solution. This high level of drag means that workers using the applicator must exert a greater degree of force pulling or pushing the mop along the floor, which generally makes the task of applying the floor finish more difficult and tiring.

In addition to applying floor finishing compositions, the problem of excessive drag is also a concern with respect to applicators or spreading devices, e.g. paint rollers/pads, hand wipes, etc., used to apply other types of chemicals or coating compositions onto hard surfaces because the material which give the best performance in coating also often have heavy drag. Thus a need exists for an applicator that is able to provide a smooth, even coating of a chemical composition onto a substrate surface with a relatively low level of drag.

SUMMARY

The present invention features a fabric that is useful for applying chemical compositions, for example floor finishing compositions, onto a substrate surface, such as a floor. The fabric of the invention may be composed of at least two different types of material. The first material is a support material that helps provide compressive strength to the fabric. The support material can be composed of, for example, stiff or large denier fibers, sponge, nonwoven web, honeycomb material, and the like. The second material is an applicator material that is typically composed of adsorbent or small denier fibers, such as microfibers, that are suitable for spreading a chemical composition onto a substrate surface resulting in a smooth, even coating that is substantially free of streaks or brush marks.

Generally, the fabric material is provided in the form of an applicator pad that has a working surface that comes into contact with the coating composition and the substrate surface. The amount of support material present on the working surface of the pad will depend on the desired level of drag, but is generally less than 40%, typically less than 30%, more typically less than 20%, and most typically less than 10% with the remaining portion of the working surface being made up of applicator material. In certain implementations, the working surface of the pad comprises between about 1% to about 50% of the support material and about 50% to about 99% of the applicator material. More typically, the working surface of the pad comprises between about 2% to about 10% of the support material and about 90% to about 98% of the applicator material. Most typically, the working surface comprises about 5% to about 9% of the support material and about 91 to about 95 of the applicator material.

In another aspect, the invention features applicator pad in which the ratio of support material to applicator material is between about 1 to 1 and about 0.1 to 10, more typically between about 1 to 10 and about 0.2 to 10. In one embodiment of the invention, the support material comprises polypropylene and/or polyethylene fibers and the applicator material comprises polyester fibers.

In an alternative embodiment, both the support material and the applicator material are the same or similar substances such as polypropylene, polyethylene or polyester. The applicator material may be able to provide a support function if, for example, the fibers are tightly packed together so as to improve the compressive strength of the material.

The support material is generally substantially the same height or at a different height than the applicator material. The support material and the applicator material may be distributed across the working surface in any suitable fashion and may be in a pattern, such as, for example, alternating strips or rows.

Previously, the use of stiff or large denier fibers in applicator systems for applying coatings onto substrates was often associated with undesired streaks or brush marks in the coating. One of the advantages of the present invention is that the applicator pad containing stiff fibers in combination with adsorbent or absorbent fibers exhibits reduced drag while still providing a smooth coating, substantially free of streaks or marks. As demonstrated in the examples section below, the use of relatively small amounts of support material in combination with an applicator material has a surprisingly dramatic reduction in drag without compromising the quality of the coating that is achieved.

Applicator pads constructed of the fabric of the invention can be used, for example, as mop heads for applying floor finishing compositions. Alternatively, they can be used in other applicator systems for applying any of a variety coating compositions, such as, for example, floor finish, wax, paint polish, detergents, disinfectants, cleaners, adhesives, and the like.

Other features and advantages of the invention will be apparent from the following drawings and detailed description, and from the claims.

DEFINITIONS

By "stiff fibers" is meant fibers that resist compression under load.

By "large denier fiber" is meant a relatively thick, heavy, or stiff fiber, bundle of fibers, tow, or yarn having a denier of at least about 10 more typically at least about 15 denier.

By "microfibers" is meant small diameter fibers having an average diameter not greater than about 25 microns, for example, having an average diameter of from about 0.5 microns to about 20 microns, or more particularly, microfibers may have an average diameter of from about 2 microns to about 10 microns.

By "small denier fibers" is meant a fine fiber, bundle of fibers, tow, or yarn having a denier of no more than about 1 denier.

By "sticktion" is meant an attractive force between two surfaces in contact with one another. "Sticktion" is considered to be an amalgam of the words "stick" or "sticking" and "friction." As used herein, sticktion refers to an increased force required to move the wet applicator over the surface to be treated, the increased force being in addition to the frictional force.

By "applicator material" is meant fibers or other fabric materials (e.g. webs, scrims, foams, sponge-like materials, etc.) or combinations thereof that are suitable for spreading a substantially even coating onto a substrate surface. Typically the applicator material is made up of small denier or highly absorbent fibers, e.g., microfibers.

By "highly adsorbent fibers" is meant fiber of high water adsorption rate, such as polyester microfibers of lower than 1.0 denier or microfibers of polyester and nylon.

By "applicator" is meant a device for applying a chemical composition or coating onto a substrate surface.

By "pad" is meant a fabric, material, or other media.

By "floor finish" or "floor finishing composition" is meant a composition capable of providing a temporary or permanent protective coating, typically a clear coating, onto the surface of floor.

By "support material" is meant fibers or other fabric materials (e.g. webs, scrims, foams, sponge-like materials, etc.) or combinations thereof that are constructed of a relatively stiff or resilient material, e.g. stiff or large denier fibers, that reduces compression of the fabric or applicator pad thereby reducing drag on the fabric surface during use. Typically, the support material is made of any material characterized in that when the working surface of the fabric comprises about 2% to about 10% of the support material the average push force of the fabric is less than 4.5 newtons and the average pull force is less than 8.0 newtons as measured by the drag force test described below.

By "working surface" is meant the surface of the applicator pad that is intended to come into contact with the substrate surface, e.g. the floor surface.

By "adsorption" is meant the accumulation of molecules of a substance to form a thin film on the surface of a solid. By "absorption" is meant a process in which one substance permeates another, such as a fluid permeates or is dissolved by a liquid or solid.

Unless otherwise indicated, all numbers expressing lengths, quantities, percentages and other measurements used in the specification and the claims are to be understood as being modified in all instances by the term "about." Accordingly, unless indicated to the contrary, the numerical parameters set forth in the specification and claims are approximations that may vary depending upon the desired properties sought to be obtained by the present invention. At the very least, and not as an attempt to limit the scope of the claims, each numerical parameter should at least be construed in light of the number of reported significant digits and by applying ordinary rounding techniques and principals.

Notwithstanding that the numerical ranges and parameters setting forth the broad scope of the invention are approximations, the numerical values set forth in the specific examples are reported as precisely as possible. Numerical values, however, inherently contain certain errors necessarily resulting from the standard deviation found in their respective testing measurements.

FIG. **2*a*** is a diagram showing the cross-sectional view of an applicator pad in which the strips of support material are of greater height than the applicator material.

FIG. **2*b*** is a diagram showing the cross-sectional view of an applicator pad in which the strips of support material are of lesser height than the applicator material.

Figure 3:
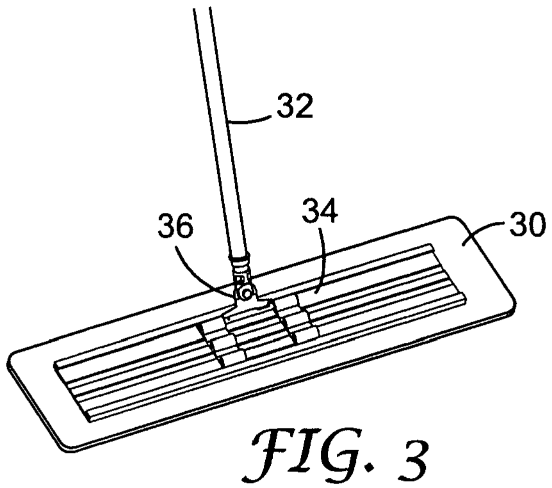

FIG. 3 is a mop equipped with an applicator pad of the according to the present invention.

Figure 4:
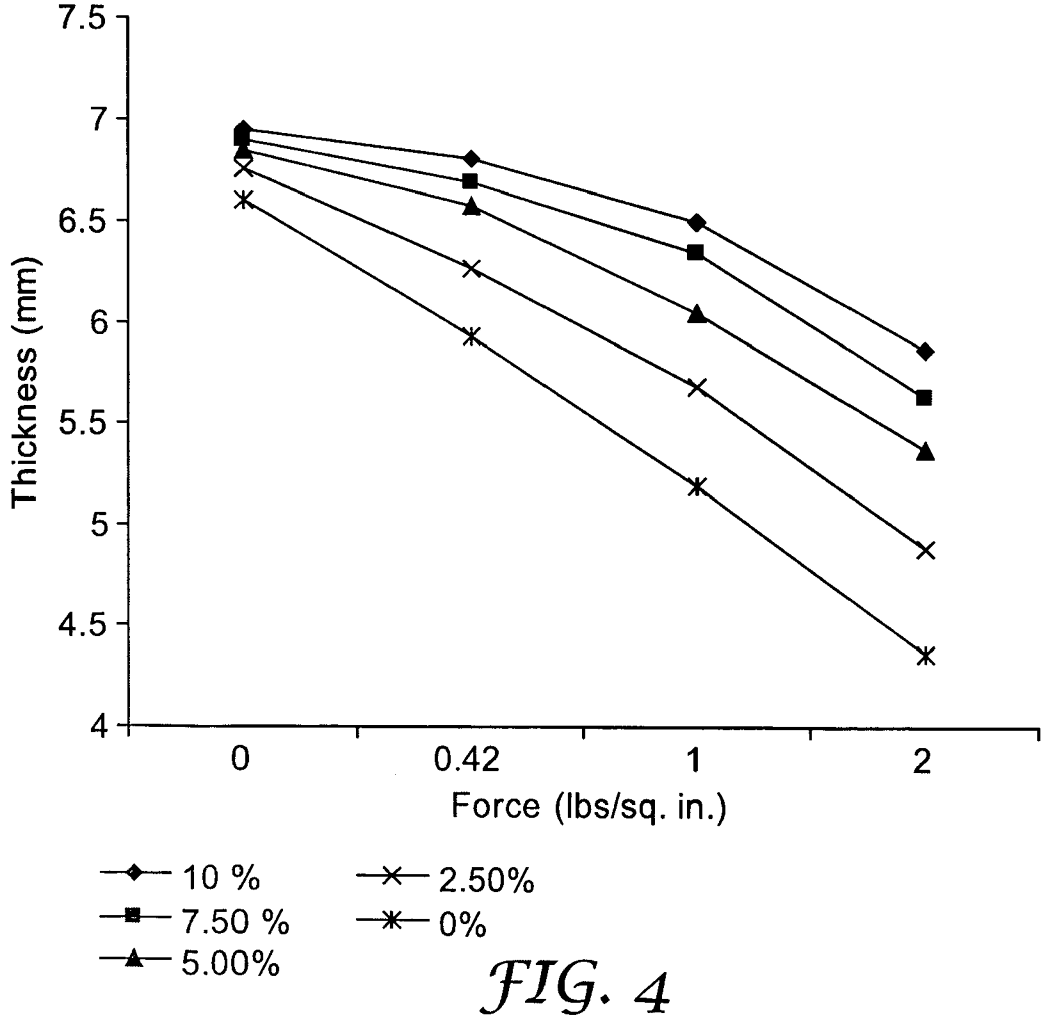

FIG. 4 is a graph showing the relationship between the amount of large denier fiber present on the working surface of an applicator pad and the force required to compress the pad.

DETAILED DESCRIPTION

The present invention features an applicator pad, for example a flat mop head, that is able to uniformly spread floor finish on a floor yet exhibits very low drag forces compared to conventional applicator pads used in mop constructions. The reduced drag characteristic of the applicator pad of the invention results from the incorporation of a supporting element into the fabric of the applicator pad.

Figure 1:
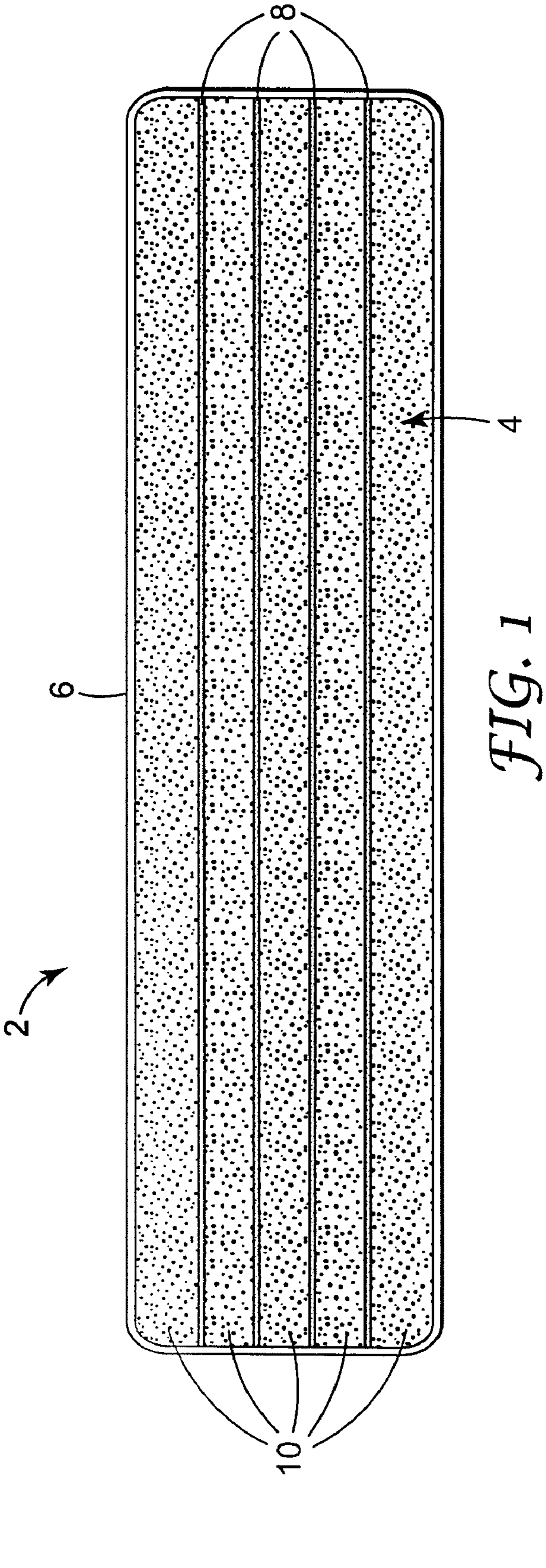
FIG. 1 is a schematic diagram of one embodiment of an applicator pad having alternating strips of support material and applicator material.

Referring now to FIG. 1, in one embodiment the applicator pad 2, includes a working surface 4 and a non-working surface 6. The working surface 4 includes at least two different materials: a support material 8, which can be made up of stiff fibers, such as tufted polypropylene and/or polyethylene fibers, and an applicator material 10, which can be made up of microfibers, such as polyester microfibers.

The applicator pad generally contains a sufficient amount of support material to reduce the drag as compared to a pad lacking support material, but does not contain so much support material that the quality of the coating is significantly reduced, typically less than about 50%, more typically less than about 30%, and most typically less than about 10% of the surface area of the working surface of the pad. In one embodiment, the working surface of the pad contains about 2 to about 10% of the support material, e.g. stiff fibers, and about 90 to about 98% of the applicator material, e.g., adsorbent or absorbent microfibers.

Figure 2B:
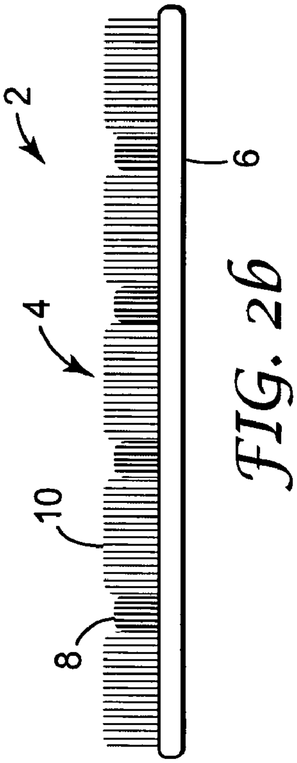
Figure 2A:
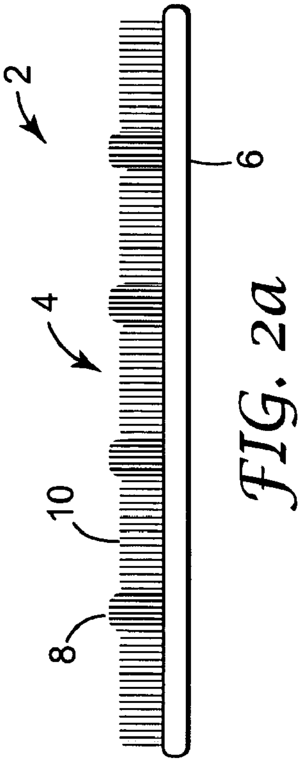

As shown in FIG. 2*a*, the height of the support material 8 may be greater than that of the applicator material 10. Alternatively the height of the support material may be substantially equal to that of the applicator material, or the applicator material may even have a greater height (see FIG. 2*b*); however, if the support material is too short to contact the substrate when under the normal forces used during the application process then the support function provided by the support material would be negated. Conversely, if the support fibers are too high then the applicator material would not be able to contact the floor surface, resulting in impaired coating quality.

A variety of different materials may be used as the support material. Stiff or large denier fibers are typically used as the supporting element in the mop to keep the applicator material, which is preferably composed of small denier fibers, from collapsing at the substrate surface thereby reducing drag. The stiff or large denier fibers can be monofilaments, yarns, tows, or bound filamentous materials. The bound materials may be bonded together by adhesive, welding, wrapping, or other methods known in the art.

Stiff or large denier fibers having a high bending stiffness and high elasticity are particularly well suited as a support material. Typically, the stiff or large denier fibers have low water absorbance, low compressibility, and low flexibility. However, the materials that may be used as a support material are not limited to filament fibers, and could also includes webs, foams, and other sponge-like materials. Examples of support materials for the applicator pad include, but are not limited to, polypropylene and/or polyethylene fibers.

Alternative support materials include nonwoven materials such as, for example, the lofty nonwoven material described in U.S. Pat. No. 2,958,593 and U.S. Pat. No. 4,893439, and woven materials such as scrims and screens.

Substances suitable as support materials include, but are not limited to, polypropylene, polyethylene, polyesters, polyurethanes including modified polyurethanes, polyamides such as nylons, and mixtures and combinations thereof.

Suitable support materials typically include those that reduce stiction, are easily cleaned, are stain resistant, can be solution dyed, and are fungus and mildew resistant.

Suitable applicator materials include those that able to provide a smooth coating without leaving undesired streaks or brush marks. Highly absorbent or adsorbent fibers or microfibers are particularly well suited as an applicator material. However, as with the support material, the applicator material may be constructed of materials other than filament fibers, such as, for example, webs, foams, and other sponge-like materials, plastic elements, and the like. Exemplary applicator materials include, but are not limited to, polyester fibers, rayon, cotton, wool, polyolefins, polyamides such as nylons, and combinations thereof.

Typically, the support material is distributed across the working surface of the applicator pad. It may be uniformly distributed, or randomly distributed, or may be distributed in the form of a pattern. In one embodiment, the support material is arranged in a pattern of stripes, so that the pad comprises alternating rows or strips of support material and applicator material, as shown, for example, in FIG. 1. Alternatively, the support material may be arranged in other patterns such as checkered, chevron, circular, or diamond-shaped patterns, and the like.

The applicator pads of the invention may be fabricated using any well-known technique for fabric construction, depending on the materials to be used. They may be manufactured using methods such as circular knitting, weaving, and tufting.

In certain embodiments, the support material may be the same type of fiber/material as the applicator material, for example, by providing regions on the working surface in which the applicator material is packed tightly enough that it is able to provide the support function. In such embodiments, regions of densely packed fiber would typically comprise between about 1% and about 5% of the working surface of the fabric or applicator, more typically between about 2% and about 10%. In other embodiments, the support material and the applicator material may comprise the same type of fiber or chemical compound that has been configured to provide different mechanical/physical properties. For example, the support material and the applicator material may be the same type of material that has been woven differently, or has a different denier or density, or has been treated with a resin coating, or similar treatment that imparts the support material with different properties from the applicator material.

In some embodiments, it may be desirable to color the support material different from applicator material for differentiation and ease of identification.

The fabric used in the applicator pad can be overlooked or sewed after being covered with a cloth. Finishing the edges in this manner helps to prevent fraying of the fabric and keeps the shape of the applicator pad. The edges may be finished, for example, by adding a sheet with an adhesive to the non-working side of the fabric. The edges of the sheet and the fabric are then overlooked or covered by a cloth and sewed to make the finished edges.

In one embodiment shown in FIG. 3, the applicator pad of the invention is a flat mop head 30 that is attached to a mop handle 32, via a holder 34 that is connected to one end of the mop handle 32 with a hinge 36. The hinge allows the mop head holder 34 to tilt forward and backwards, and rotate to the right and to the left. The mop head 30 may be removably or permanently attached to the holder 34 by any suitable means. For example, the bottom of the holder 34 may be covered with a hook and loop type tape (e.g. SCOTCHMATE, VELCO, etc.) and the top of the mop head 30, i.e. the non-working side, may be covered with the matching side of the hook and loop tape. Thus, the mop head 30 can easily be joined or separated from the mop head holder 34. Ties, mechanical fasteners and the like.

Objects and advantages of this invention are further pointed out by the following examples, which are merely illustrative and in no way intended to limit the scope of the invention.

EXAMPLES

Drag Force Test

A force gauge mounting bracket and a Chatillion DFM 100 made by Ametek Inc.(US gauge Division) of Largo, Fla., USA, were assembled onto a mop comprising an adjustable mop handle, holder and mop head (3.5"×18"). A mop head to be tested was placed on the end of the mop and the mop handle length was adjusted to produce a 30-degree angle to the floor while pushing mop forward and pulling mop backward.

From a graduated beaker, 100 ml of water was applied directly to a test floor made of standard 12"×12" composite vinyl tile. The mop was moved forward and backward several times to wet the entire surface of the mop head. The mop was then pushed forward for 10 ft and the average push force was read and recorded. The mop was then pulled back to the starting position and the average pull force was read and recorded. The floor was cleaned and allowed to dry before the next test run.

Mop Performance Test

Subjects experienced in the application of floor finish were asked to lay at least 400 square feet of floor finish with a test mop using standard techniques. Afterwards, the subjects were asked to rank the mop on a scale of 1 to 5 with a score of "1" indicating poor performance, "3" indicating average performance, and "5" indicating superior performance. In assigning a score, the subjects were asked to use the following criteria for evaluating overall performance of the mop: drag; appearance of finish; ease of turning; and ability to get into corners.

Example E1 and Comparative Examples C1-C4

The above-described drag force test was performed a minimum of three times using four different mop heads, and the average push and pull forces were recorded. The four mop heads that were tested were as follows: a mop having 8% area of face fiber made of 15 denier polypropylene (Example E1) and the remaining 92% area of face fiber made of a blend of polyester fibers (80%) and polyamide fibers (20%). A GEERPRESS Mop Stock Number #2014 microfiber cloth (green) available from Geerpress, Muskegon, Mich. (Comparative Example C1); a Sanitaire Microfiber Premium mop 18 available from Eureka Company, Bloomington, Ill. (Comparative Example C2); and a string mop available under the trade designation RUBBERMAID F516 Premium cut end blend mop available from Rubbermaid Commercial Producst, Winchester, Va. (Comparative Example C3). In contrast to the E1 mop, none of the mops C1-C3 had any large denier fibers as part of the mop head construction. The results of the drag force test are shown below in Table 1.

TABLE 1

Drag Force.

| | Mop | | | |
|---|---|---|---|---|
| Drag Force* | E1 | C1 | C2 | C3 |
| Average Push Force (Newtons) | 3.1 ± 0.9 | 8.2 ± 1.2 | 5.1 ± 0.5 | 11.6 ± 0.2 |
| Average Pull Force (Newtons) | 5.3 ± 0.6 | 12.0 ± 1.4 | 9.0 ± 0.7 | 8.9 ± 0.3 |

*Force on a 3.5 × 18 inch pad surface.

In addition to being tested for drag force, the E1, C2 and C3 mops were also evaluated using the mop performance test described above. A commercially available poodle mop under the trade designation Tuway Flat Floor Finish Mop TL 18FM available from Tuway American Group, Troy, Mich. (Comparative Example C4), which contained no stiff fibers in the mop head construction, was also evaluated with this test. Five different subjected evaluated each of these mops. The overall performance scores of each of the five subjects were averaged and the results are reported in Table 2, below.

TABLE 2

Overall performance

| Mop | Overall Performance |
|---|---|
| E1 | 4.8 + 0.4 |
| C2 | 2.4 + 0.5 |
| C3 | 2.4 + 0.5 |
| C4 | 3.2 + 0.4 |

As the above data demonstrate, the mop head containing 8% large denier fibers (E1) had significantly less drag than conventional mops that contained no large denier fibers, while and the same time exhibited a superior overall performance.

Examples E2-E5 and Comparative Example C5

Mop constructions were made at different large denier combinations (straight line) ranging from 0% large denier fiber face fiber up to 10% large denier face fiber. Specimens 4"×4" were cut for testing. Initial thickness was recorded using a modified Starret Granite thickness apparatus with Mitutoyo Digimatic thickness indicator. The foot of the indicator was mounted with a 3.5" diameter aluminum disk weighing 95.4 grams. Individual weight were added to the foot to create different forces. The test specimen was place onto the Starret granite pad and foot lowered. Thickness measurements were taken after 10 seconds.

The following constructions were tested and the results are provided in Table 3, below, and in FIG. 4.

TABLE 3

Compression vs. % Large Denier Fiber.

| Force | Thickness (mm) | | | | |
|---|---|---|---|---|---|
| (lbs./sq. in.) | C5 | E2 | E3 | E4 | E5 |
| 0 | 6.60 | 6.75 | 6.84 | 6.90 | 6.95 |
| 0.42 | 5.93 | 6.27 | 6.57 | 6.69 | 6.81 |
| 1 | 5.20 | 5.69 | 6.05 | 6.34 | 6.50 |
| 2 | 4.36 | 4.89 | 5.38 | 5.63 | 5.87 |

E2: 10% large denier fiber
E3: 7.5% large denier fiber
E4: 5% large denier fiber
E5: 2.5% large denier fiber
C5: 0% large denier fiber As the above data demonstrate, mop heads containing 2.5 to 10% large denier fiber exhibited greater resistance to compression than a mop head containing no large denier fibers. The increase in resistance to compression increased as the percentage of large denier fiber in the mop head increased.

Other Embodiments

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

The complete disclosures of the patents, patent documents, and publications cited herein are incorporated by reference in their entirety as if each were individually incorporated.

What is claimed is:

1. A fabric for applying a chemical composition onto a substrate surface, the fabric comprising a working surface comprising 5-9% of a support material comprising stiff or large denier fibers and about 91-95% of an applicator material comprising small denier fibers, wherein the support material is distributed in the form of a pattern.

2. The fabric of claim 1, wherein the applicator material comprises adsorbent fibers.

3. The fabric of claim 2, wherein the adsorbent fibers are microfibers.

4. The fabric of claim 2, wherein the pattern comprises stripes of alternating rows or strips of support material and applicator material on the working surface.

5. The fabric of claim 4, wherein the stiff fibers comprise fibers selected from polypropylene and polyethylene fibers and combinations thereof, and the adsorbent fibers comprise polyester fibers.

6. The fabric of claim 4, wherein the stiff fibers are substantially the same height as or higher than the adsorbent fibers.

7. The fabric of claim 2, wherein the stiff fibers and the adsorbent fibers comprise fibers of the same type of material.

8. An applicator pad comprising the fabric of any of claims 1 to 6.

9. A mop for applying a floor finishing composition, the mop comprising:

a handle, and a mop head construction attached to an end of the handle, the mop head construction comprising a working surface comprising 5-9% of a support material comprising stiff or large denier fibers and about 91-95% of an applicator material comprising small denier fibers, wherein the support material is distributed in the form of a pattern.

10. The mop of claim 9, wherein the applicator material comprises adsorbent fibers.

11. The mop of claim 10, wherein the adsorbent fibers are microfibers.

12. The mop of claim 11, wherein the stiff fibers comprise fibers selected from polypropylene and polyethylene fibers and combinations thereof, and the adsorbent fibers comprise polyester fibers.

13. The mop of claim 11, wherein the stiff fibers are substantially the same height as or higher than the adsorbent fibers.

14. The mop of claim 10, wherein the pattern comprises stripes of alternating rows or strips of support material and applicator material on the working surface of the applicator pad.

15. The mop of claim 10, wherein the stiff fibers and the adsorbent fibers comprise fibers of the same type of material.

16. An applicator pad comprising a working surface, the working surface comprises a support material comprising stiff or large denier fibers and an applicator material comprising small denier fibers, wherein the support material is distributed in the form of a pattern, and wherein the ratio of the support material to the applicator material is between about 1 to 10 and about 0.2 to 10.

17. The applicator pad of claim 16, wherein the applicator material comprises adsorbent fibers.

18. The applicator pad of claim 17, wherein the adsorbent fibers are microfibers.

19. The applicator pad of claim 17, wherein the pattern comprises stripes of alternating rows or strips of support material and applicator material on the working surface of the applicator pad.

20. The applicator pad of claim 19, wherein the stiff fibers comprise fibers selected from polypropylene and polyethylene fibers and combinations thereof, and the adsorbent fibers comprise polyester fibers.

21. The applicator pad of claim 17, wherein the stiff fibers are substantially the same height as or higher than the adsorbent fibers.

22. The applicator pad of claim 17, wherein the stiff fibers and the adsorbent fibers comprise fibers of the same type of material.

23. A fabric for applying a chemical composition onto a substrate surface, the fabric comprising a working surface comprising 5-9% of a support region or regions comprising stiff or large denier fibers and about 91-95% of an applicator region or regions comprising small denier fibers, wherein the support region or regions are distributed in the form of a pattern.

24. The fabric of claim 23, wherein the applicator region or regions comprise an applicator material and the support region or regions comprise the same type of material.

* * * * *